United States Patent
Jocic et al.

[19]

[11] Patent Number: 5,924,590
[45] Date of Patent: *Jul. 20, 1999

[54] FUEL CAP

[75] Inventors: Radisav Jocic, Richmond Hill, Canada; Konrad Scharrer, Hilden, Germany

[73] Assignee: Tesma International Inc., Concord, Canada

[*] Notice: This patent is subject to a terminal disclaimer.

[21] Appl. No.: 08/989,400

[22] Filed: Dec. 12, 1997

Related U.S. Application Data

[62] Division of application No. 08/616,497, Mar. 19, 1996, Pat. No. 5,732,841.

[51] Int. Cl.$^6$ .................................................. B65D 51/16
[52] U.S. Cl. .................... 220/203.24; 270/298; 270/303; 270/304; 270/375; 270/DIG. 33
[58] Field of Search ......................... 220/203.05, 203.06, 220/203.24, 203.28, 212.5, 295, 298, 300, 301, 303, 304, 375, DIG. 33

[56] References Cited

U.S. PATENT DOCUMENTS

| | | |
|---|---|---|
| 3,405,837 | 10/1968 | Carpenter, Jr. . |
| 3,831,801 | 8/1974 | Rodgers . |
| 3,856,316 | 12/1974 | Badberg . |
| 4,000,632 | 1/1977 | Summan . |
| 4,036,399 | 7/1977 | Gerdes . |
| 4,091,955 | 5/1978 | Sloan, Sr. . |
| 4,142,756 | 3/1979 | Henning et al. . |
| 4,177,931 | 12/1979 | Evans . |
| 4,320,853 | 3/1982 | Moore . |
| 4,416,391 | 11/1983 | Sarrazin ................................. 220/304 |
| 4,676,390 | 6/1987 | Harris . |
| 4,678,097 | 7/1987 | Crute . |
| 4,705,190 | 11/1987 | Mizusawa . |
| 4,765,505 | 8/1988 | Harris . |
| 4,795,053 | 1/1989 | Kasugai et al. .......................... 220/203 |
| 4,809,869 | 3/1989 | Cosgrove et al. ....................... 220/288 |
| 4,887,733 | 12/1989 | Harris . |
| 5,108,001 | 4/1992 | Harris . |
| 5,238,136 | 8/1993 | Kasugai et al. .......................... 220/304 |
| 5,277,327 | 1/1994 | Nakano et al. .......................... 220/304 |
| 5,361,924 | 11/1994 | Muller . |
| 5,381,919 | 1/1995 | Griffin et al. . |
| 5,395,004 | 3/1995 | Griffin et al. . |
| 5,449,086 | 9/1995 | Harris . |
| 5,462,190 | 10/1995 | Lienhart et al. ......................... 220/375 |
| 5,480,055 | 1/1996 | Harria et al. ....................... 220/203.26 |
| 5,529,201 | 6/1996 | Tallent et al. . |
| 5,540,347 | 7/1996 | Griffin ................................ 220/203.23 |

FOREIGN PATENT DOCUMENTS

| | | |
|---|---|---|
| 0 565 307 A1 | 10/1993 | European Pat. Off. . |
| 59-43239 | 12/1984 | Japan . |
| 60-62062 | 4/1985 | Japan . |
| 2 19 480 | 3/1988 | United Kingdom . |

*Primary Examiner*—Stephen Cronin
*Attorney, Agent, or Firm*—Pillsbury Madison & Sutro L.L.P.

[57] ABSTRACT

A fuel cap and filler neck fitment for receiving the fuel cap. The fuel cap includes an outer member and an inner closure assembly with seal. The cap and fitment both include lugs which interengage when the cap is moved into a closing position to pressurize the seal determined by an improved overriding ratchet arrangement. During removal of the cap, the outer member moves against a spring action for a predetermined arc before the inner closure assembly is moved to disengage the seal. When the seal is disengaged, the spring action takes up the relative motion. Once removed, the cap is retained by an improved tether assembly. The outer member is connected to the inner annular assembly by an improved structural arrangement which allows the outer member to separate under crash impact.

33 Claims, 5 Drawing Sheets

FUEL CAP

This is a Divisional of National Appln. No. 08/616,497 filed Mar. 19, 1996, now U.S. Pat. No. 5,732,841.

This invention relates to fuel caps and more particularly to fuel caps of the type that are adapted to be moved into and out of a closing position within a fuel tank filler neck by oppositely directed torque movements.

In recent years, the most popular type of fuel cap utilized is the so-called threaded or multiple turn gas gap. An early version of this type cap is disclosed in U.S. Pat. No. 4,091,955. A typical threaded fuel cap includes an outer handle component, an inner closure component and a torque override connection between the handle and closure. The inner closure component is made up of a tubular body having suitable valving mounted interiorly thereof. The lower exterior of the portion of the body is threaded to engage within cooperating threads formed in the upper end of the fuel neck. Extending radially outwardly from the tubular body above the threads is an annular flange. An annular seal made of resilient material with a generally C-shaped cross-sectional configuration is engaged under the annular flange. The torque override drive between the handle and closure body is provided to insure that during installation the closure body will be threaded into fuel neck only an amount necessary to deform the seal into proper sealing in relation with the mouth of the fuel neck. By turning the handle until the torque override drive slips to provide a series of clicks, the user knows that installation has been completed with enough sealing pressure and not an excessive amount.

Prior to the current popularity of the threaded fuel cap described above, quick turn lug type fuel caps were the most popular. An example of a fuel cap of this type is described in U.S. Pat. No. 4,036,399. A typical lug type fuel cap also includes an outer handle component, an inner closure component and a direct drive connection between the handle component and the closure component. The closure component included a tubular body having suitable valving mounted interiorly thereof and a gasket carrying flange on the upper exterior thereof. The lugs of the closure component were mounted for spring biased axial movement in the lower portion of the closure body. The spring mounting of the lugs insures that when the lugs are moved through the slots in the upper end of the fuel neck and then turned beneath the lugs of the fuel neck mouth, the spring will impart a proper sealing pressure on the gasket when the lugs are fully turned to a rigid stopping position.

The threaded type cap has the disadvantage that it is much more difficult to install and remove due to the number of rotations that the user must turn the handle. The lug type has the disadvantage that the pressure of the seal is dependent upon the strength of the spring which can be affected by weather conditions and mechanical tolerances in manufacture.

It is an object of the present invention to provide a fuel cap which eliminates the disadvantages noted above which are found in both lug type and threaded caps while retaining the advantages of both.

In accordance with the principles of the present invention this objective is achieved by providing a fuel cap comprising an inner closure assembly constructed and arranged to be moved into and out of a closing position within a fuel tank filler neck by oppositely directed installation and removal torque movements about an axis. The inner closure assembly includes an annular closure member having a plurality of annularly spaced cap lugs fixed thereon constructed and arranged to pass axially through a plurality of lug receiving positions defined by filler neck lugs on the filler neck and to move annularly about the axis in cooperating relation with the filler neck lugs when the inner closure assembly is moved into and out of closing position within the fuel tank filler neck. The annular closure member also has a transversely extending annular flange thereon in axially fixed relation to the plurality of cap lugs. An axially deformable annular seal is mounted on the annular closure member in abutting relation to the annular flange and is constructed and arranged to engage and seal with an annular sealing surface of the filler neck. The fuel cap includes an outer member constructed and arranged to be manually engaged and to have oppositely directed installation and removal torque movements manually applied thereto. The fuel cap also includes connecting structure between the inner closure assembly and the outer member constructed and arranged to enable manually engaged movements of the outer member to be transmitted to the inner closure assembly to move the inner closure assembly into and out of the closing position. The connecting structure includes a torque override ratcheting assembly constructed and arranged to transmit to the closure assembly (1) installation torque movements applied to the outer member after the cap lugs have been passed axially through the lug removing positions of the filler neck and (2) removal torque movements applied to the outer member after the closure assembly has been moved into the closing position thereof. The torque override ratcheting assembly is constructed and arranged such that the aforesaid installation torque movements applied to the outer member will move the cap lugs annularly about the axis in cooperating relation with the filler neck lugs to effect a progressive axial deformation of the annular seal between the annular flange and the annular sealing surface of the filler neck until a predetermined amount of torque applied to the outer member establishes a proper seal deformation and thereafter ratcheting override movements of the outer member take place without movement of the cap lugs.

A distinct advantage of the fuel cap described above is that the combined user friendliness and structural simplicity thereof makes it possible to provide a fuel cap which has these advantages and by a simple change in the connection of the torque override ratcheting assembly from a direct connection with the outer member to a spring biased lost connection, the cap can include the further function of resistance to the breakage of the seal in the event of an accident. It is known to provide seal breakage resistance by a spring biased lost motion connection. U.S. Pat. Nos. 5,361,924 and 5,480,055 disclose fuel caps embodying a spring pressed lost motion connection however the caps disclosed in both of these patents also embody a complex construction which greatly diminishes the cost effectiveness thereof.

Accordingly, it is a further object of the present invention to provide a fuel cap of the type described above which further provides that the connecting structure includes a torque transmitting member disposed axially inwardly of the outer member, the outer member and the torque transmitting member are constructed and arranged to allow relative movement to take place therebetween about the axis in opposite directions between first and second limiting positions and a spring system is provided between the outer member and the torque transmitting member resiliently biasing the outer member and the torque transmitting member to move relatively into the first limiting position, the connecting structure including the torque transmitting member and the spring system is constructed and arranged such that (1) installation torque movements applied to the outer member are transmitted to the torque transmitting member and through the torque override ratcheting assembly to move the cap lugs into the closing position as aforesaid and (2) removal torque movements applied to the outer assembly when the inner closure assembly is in the closing position move the outer member relative to the torque transmitting member against the bias of the spring system until the outer member is in the second limiting position with respect to the torque transmitting member after which further removal movements of the outer member are transmitted to the torque transmitting member through the torque override ratcheting assembly to move the inner closure assembly so that when the amount of movement transmitted is sufficient to permit relative unrestricted torque movement of the inner closure assembly with respect to the filler neck, the spring system is operable to effect a relative movement between the outer member and the torque transmitting member from the second limiting position thereof into the first limiting position thereof, during which movement of the torque transmitting member, the inner closure assembly is connected to the torque transmitting member by the torque override ratcheting assembly.

The fuel cap of the present invention identified above provides a limited turning movement within which the torque override ratcheting assembly must function as compared with the conventional threaded cap. It is greatly preferred to provide the cap with a torque override which is more cost effective while at the same time one in which tolerances do not vary the overriding torque value within a wide range. The present application provides such a torque override ratcheting assembly which is preferably embodied in the cap described above although in its broadest aspects the cap of the present invention identified above may embody any known torque override ratcheting assembly. Conversely, in the broadest aspects of the present invention the particular torque override ratcheting assembly of the present invention may be embodied in known threaded caps in lieu of the torque override ratcheting assembly embodied therein.

Accordingly, it is a further object of the present invention to provide a fuel cap comprising an inner closure assembly constructed and arranged to be moved into and out of a closing position within a fuel tank filler neck by oppositely directed torque movements about an axis. The inner closure assembly includes an axially compressible annular seal constructed and arranged so that (1) during the torque movement of the inner closure assembly in a direction to move the inner release assembly toward the closing position the seal is engaged with the filler neck and then increasingly compressed against the filler neck after engagement therewith until the inner closure assembly is moved into the closing position and (2) during the torque movement of the inner closure assembly in a direction out of the closing position the seal is relieved of compression against the filler neck and then disengaged from the filler neck. An outer member is provided which is constructed and arranged to be manually engaged and to have oppositely directed torque movements manually applied thereto and connecting structure between the inner closure assembly and the outer member constructed and arranged to enable oppositely directed torque movements manually applied to the outer member to be transmitted to the inner closure assembly to move the inner closure assembly into and out of the closing position. The inner closure assembly includes an inner annular member concentric with the axis. The connecting structure includes a series of ratchet teeth formed in the inner annular member, a pair of integrally interconnected cantilevered pawl elements operatively associated with the outer member disposed in opposed equally spaced relation from the axis and a compression coil spring disposed in stressed relation between the pair of cantilevered pawl elements so as to resiliently bias the pair of cantilevered pawl elements into engagement with the ratchet teeth, the cantilever pawl elements and the ratchet teeth being constructed and arranged to (1) transmit torque movements manually applied to the outer member in a direction to move the inner closure assembly out of the closing position which are imparted to the cantilevered pawl elements to the ratchet teeth to move the inner closure assembly out of the closing position and (2) transmit torque movements manually applied to the outer member in a direction to move the inner closure assembly toward the closing position imparted to the cantilevered pawl elements to the ratchet teeth in a manner which includes overriding movements therebetween preventing torque transmittal therebetween above a predetermined value to thereby determine when the inner closure assembly has reached the closing position the extent of axial compression imparted to the seal.

Another feature which is desirable in a fuel cap is the feature of building into the cap assembly the capability of allowing the outer shell to break away from the inner closure assembly under crash conditions in such a way as to maintain or retain the viability of the seal of the inner closure assembly with the filler neck. The present application contemplates a feature of this type which is more cost-effective and more efficient which can be optionally embodied in the fuel cap identified above or in known fuel caps embodying the feature to replace the same.

Accordingly, a further object of the present invention is to provide a fuel cap comprising an inner closure assembly which is constructed and arranged to be moved into and out of a closing position within a fuel tank filler neck by oppositely directed torque movements about an axis. The inner closure assembly includes an axially compressible annular seal constructed and arranged so that (1) during the torque movement of the inner closure assembly in a direction to move the inner closure assembly toward the closing position the seal is engaged with the filler neck and then increasingly compressed against the filler neck after engagement therewith until the inner closure assembly is moved into the closing position and (2) during the torque movement of the inner closure assembly in a direction out of the closing position the seal is relieved of compression against the filler neck and then disengaged from the filler neck. An outer member is provided which is constructed and arranged to be manually engaged and to have oppositely directed torque movements manually applied thereto and connecting structure is provided between the inner closure assembly and the outer member constructed and arranged to enable oppositely directed torque movements applied to the outer member to be transmitted to the inner closure assembly to move the inner closure assembly into and out of the closing position. The inner closure assembly includes an inner annular member having an annular connecting ring connected with the outer member and a series of equally annularly spaced connecting elements extending inwardly therefrom to a central annular portion at positions disposed axially outwardly of the annular seal. The equally spaced connecting elements are constructed and arranged integrally between the annular connecting ring and the central annular portion so as to provide areas across the connecting elements where fracture surfaces develop in response to lateral crash impacts imparted to the outer member along the skirt thereof to thereby allow the outer member to be separated from the inner closure assembly in a manner which retains the integrity of the annular seal with the filler neck.

It has been proposed in the patented literature to provide fitments at the top of a filler neck which fitment can be molded to cooperate with the molded interior closure assembly of the cap. Examples of patents of this type are U.S. Pat. No. 5,381,919, dated Jan. 7, 1995, and U.S. Pat. No. 5,395,004, dated Mar. 7, 1995. The arrangements provided by these patents are somewhat costly and, hence, there still exists a need to provide a fitment of this type which is more cost effective and efficient.

Accordingly, it is still another object of the present invention to fulfill the need immediately expressed above. In accordance with the principles of the present invention, this objective is achieved by providing a fitment mountable on the end of a fuel filler neck and a cap cooperable with the fitment. The fitment comprises an annular body open at its upper end and having a bottom wall at its lower end formed with a nozzle receiving opening therein. A flap valve is provided on the underside of the bottom wall. The flap valve is constructed and arranged to normally close the nozzle receiving opening and to allow a nozzle to be moved through the opening to move the flap valve away from closing relation with the opening and allow the nozzle to communicate with the filler neck below the bottom wall. The annular body has a seal engaging annular surface at its open upper end and a plurality of cap connecting lugs extending inwardly from the open upper end thereof in annularly spaced relation so as to define a plurality of annularly spaced cap lug entering positions within the open end of the annular body. The cap includes an inner closure assembly including an inner annular member of a size to enter within the open end of the annular body within the cap connecting lugs thereof. The inner annular member has a plurality of integral lugs extending outwardly thereof in annularly spaced relation of a size to enter within the cap lug entering positions of the annular body, the inner annular member having an integral annular flange extending outwardly therefrom in axially outwardly spaced relation from the lugs. An axially compressible annular seal extends around the inner annular member in abutting relation below the annular flange. An outer member is constructed and arranged to be manually engaged and to have oppositely directed torque movements manually applied thereto and connecting structure is provided between the inner closure assembly and the outer member which is constructed and arranged to enable oppositely directed torque movements applied to the outer member to be transmitted in a predetermined way to the inner closure assembly to move the inner closure assembly into and out of the closing position. The plurality of cap lugs and the plurality of cap connecting lugs have interengaging surfaces constructed and arranged so that when the inner annular member is moved within the annular body and turned in one direction into a closing position with respect to the annular body, the interengaging surfaces will interengage and cause the annular seal to be compressed between the annular flange and the annular seal engaging surface.

Another feature which is desirable in a fuel cap is the provision of a tether for the cap. Examples of tethering arrangements in the patented literature are as follows: U.S. Pat. No. 4,320,853, dated Mar. 23, 1982 and U.S. Pat. No. 4,705,190, dated Nov. 10, 1987. There still exists a need for a tethering arrangement which can be utilized simply and which is cost-effective.

Accordingly, it is still another object of the present invention to provide a fuel cap which fulfills the need immediately expressed above. In accordance with the principles of the present invention, this objective is achieved by providing a fuel cap comprising an inner closure assembly constructed and arranged to be moved into and out of a closing position within a fuel tank filler neck by oppositely directed torque movements about an axis. An outer member is provided which is constructed and arranged to be manually engaged and to have oppositely directed torque movements manually applied thereto. Connecting structure is provided between the inner closure assembly and the outer member which is constructed and arranged to enable oppositely directed torque movements applied to the outer member to be transmitted to the inner closure assembly to move the inner closure assembly into and out of the closing position. A tether assembly is carried by the outer member. The tether assembly comprises a tether ring providing a downwardly facing generally radially extending annular surface which intersects with an inner peripheral annular surface which extends upwardly and outwardly to intersect with an upwardly facing annular surface at the upper end of the tether ring and an elongated tether element extending outwardly of the tether ring having a free end constructed and arranged to be connected at a fixed location spaced from the cap. The outer member includes a depending skirt having an annular groove formed in an outer peripheral portion thereof which defines an annular tether ring supporting flange at a lower outer periphery of the skirt. The configuration of the tether ring supporting flange cooperates with the inner peripheral annular surface of the tether ring to allow the tether ring to be moved axially upwardly over the tether ring supporting flange with a snap action into an operative position wherein the downwardly facing annular surface of the ring engages the tether ring supporting flange to support the tether ring thereon for free rotational movement with respect to the skirt.

These and other objects of the present invention will become more apparent during the course of the following detailed description and appended claims.

The invention may best be understood with reference to the accompanying drawings wherein an illustrative embodiment is shown.

Figure 3:
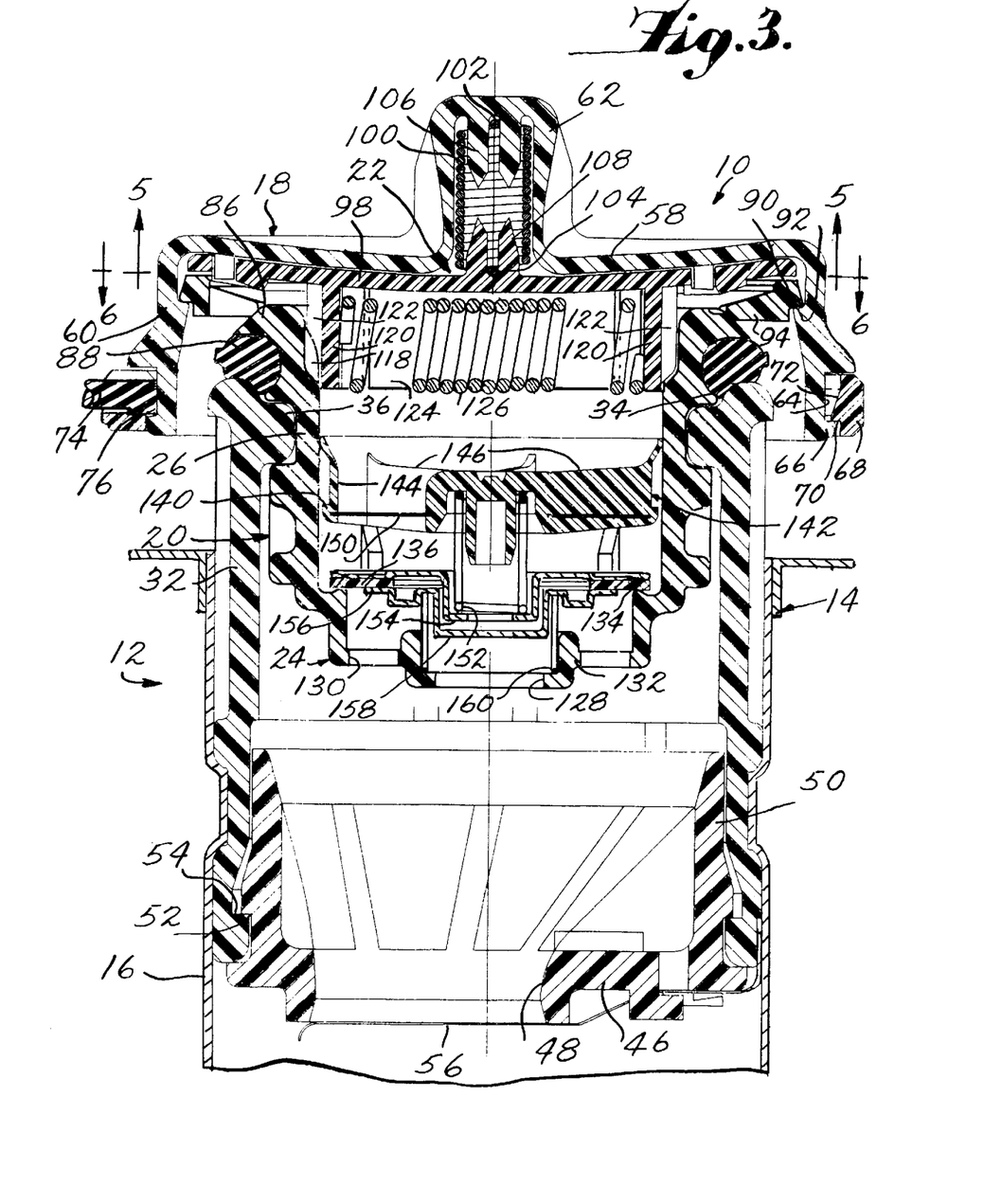
FIG. 3 is an enlarged sectional view taken along the line 3—3 of FIG. 1.

Referring now more particularly to the drawings, there is shown in FIG. 3 a fuel cap, generally indicated at 10, which embodies the principles of the present invention, the fuel cap 10 being shown in a closing position with respect to the upper end of a fuel tank filler neck, generally indicated at 12.

In its broadest aspects, the fuel cap 10 is constructed and arranged to cooperate directly with and close a fuel tank filler neck 12 of conventional construction. However, in the more specific aspects of the present invention, a fitment assembly, generally indicated at 14, is provided which is constructed and arranged to be connected to the upper end of a metal filler neck section 16 and to have the fuel cap 10 cooperatively received thereon.

The fuel cap 10 includes an outer shell member, generally indicated at 18, which is constructed and arranged to be manually engaged and to have oppositely directed torque movements manually applied thereto and an inner closure assembly, generally indicated at 20, which is constructed and arranged to be moved into and out of closing position within a fuel tank filler neck 12 by oppositely directed torque movements about an axis. The fuel cap 10 also includes connecting structure, generally indicated at 22, between the inner closure assembly 20 and the outer member 18 which is constructed and arranged to enable oppositely directed torque movements applied to the outer member 18 to be transmitted to the inner closure assembly 20 to move the inner closure assembly 20 into and out of the closing position with respect to the fuel tank filler neck 12.

Figure 2:
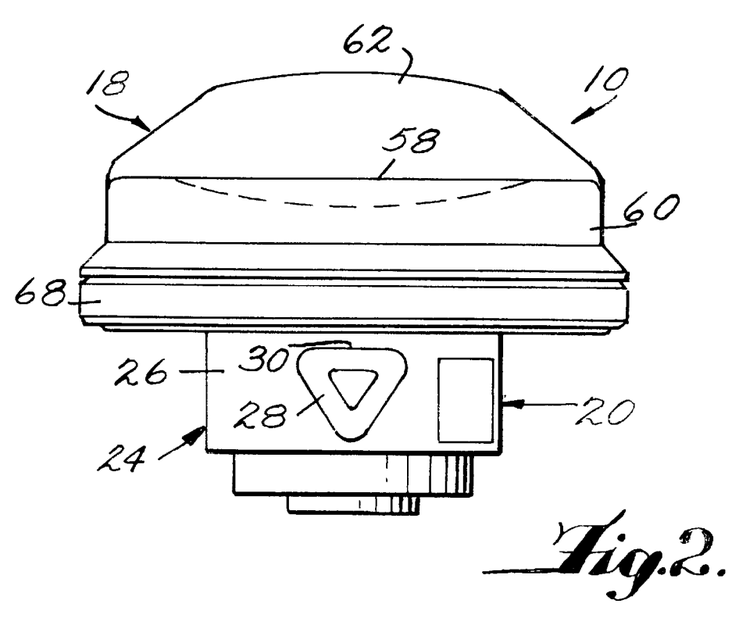
FIG. 2 is a side elevational view of the cap shown in FIG. 1.

As best shown in FIG. 2, the inner closure assembly 20 includes an inner annular member, generally indicated at 24, which includes a central annular portion 26 of a size to fit within the fuel tank filler neck opening as provided by the fitment assembly 14. As best shown in FIG. 2, the exterior periphery of the central portion 26 of the inner member 24 is formed with a pair of diametrically opposed outwardly extending lug elements 28. In FIG. 2, each of the lug elements 28 is shown in the form of a triangular hollow configuration with an upper leg of the triangle extending slightly at an angle to provide an upwardly facing locking surface 30.

Figure 4:
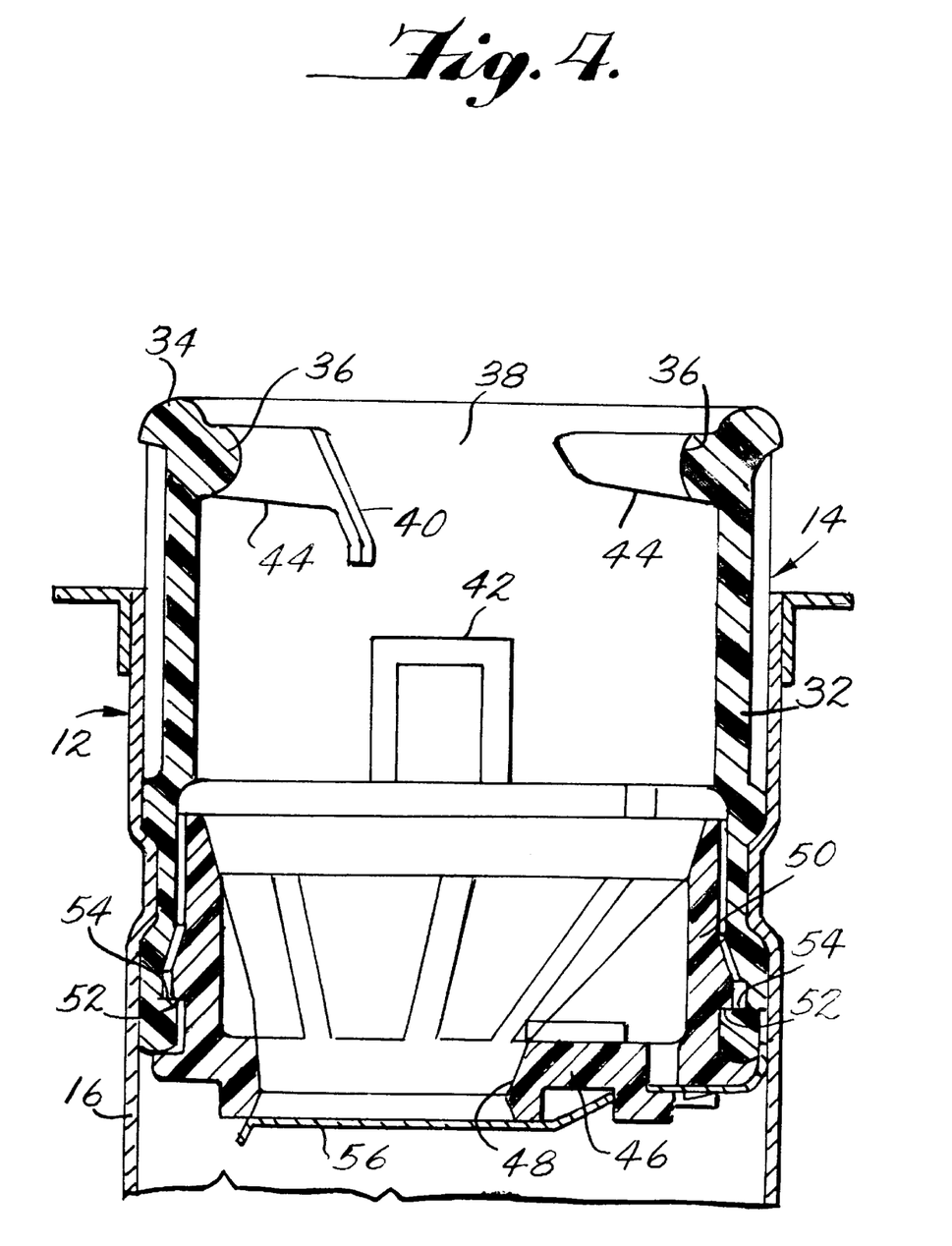
FIG. 4 is a view similar to FIG. 3 with the cap removed.

As best shown in FIG. 4, the fitment assembly 14 includes an upper annular body 32 which, like the inner annular member, is preferably molded of a suitable plastic material as, for example, acetal. The annular body 32 is formed with an upwardly facing seal engaging surface 34 defining an open upper end. A plurality of cap connecting lugs 36 extend inwardly from the open upper end in annularly spaced relation so as to define a plurality of annularly spaced cap lug entering positions 38 therebetween within the open end of the annular body 32. While it is within the contemplation of the present invention to provide more than two cap connecting lugs 36 as well as more than two lugs 28 on the cap 10, in the preferred embodiment shown, there are two cap connecting lugs 36 provided on the interior of the annular body 32 which cooperate with the two lugs 28 of the cap 10.

Extending downward from one end of each of the cap connecting lugs 36 along the interior periphery of the body 32 is a downwardly extending surface 40. An arcuately extending surface 42 is provided below each surface 40. The surfaces 40 and 42 serve to ensure that an associated cap lug 28, when moved within a lug entering position 38 within the annular body 32, can only move in one direction and that direction is in the direction toward the closing position.

In this regard, it will be noted that the cap connecting lugs 36 include slightly inclined lug engaging surfaces 44 which cooperatively engage the lug surfaces 30 when the cap 10 is moved in a direction toward its closing position with respect to the fitment assembly 14.

As best shown in FIGS. 3 and 4, the lower end of the annular body 32 has mounted therein a molded bottom wall body 46, which is separate from the annular body 32 and forms a part of the fitment assembly 14. The bottom wall body 46 provides an annular bottom wall which is formed with a nozzle opening 48. A connecting annular wall 50 of the bottom wall body 46 extends upwardly from the periphery of the bottom wall and is of a size to fit within the lower end of the annular body 32. As best shown in FIGS. 3 and 4, the exterior of the annular wall 50 is formed with a series of wedge-shaped ledges 52 and the interior periphery of the lower end of the annular body 32 is formed with an annular groove 54 which is constructed and arranged to allow the wedge-shaped elements to engage therein with a snap action when the bottom wall body 46 is moved axially with respect to the annular body in a direction in which the annular wall 50 engages within the lower end of the annular body 32. The snap action provided by the wedge-shaped elements 52 ensures that the bottom wall body 46 will be retained in the lower end of the annular body 32. It will also be noted that the annular body 32 has formed in the lower exterior periphery thereof an annular groove 54. The annular body 32 is adapted to fit within the upper end of the tubular fuel tank neck section, as shown in FIGS. 3 and 4, and the insert assembly is fixed in its operative position by cold forming an annular band of the tube into the annular groove 32.

The nozzle opening 40 is closed by a flap valve 56 which is suitably mounted on the lower end of the bottom wall body 46 in a position to engage below the surface of the bottom wall body 46 which defines the nozzle opening 48. In this way, the flap valve 56 serves to normally close the nozzle opening 48 and to allow a nozzle to be moved through the opening 48 to move the flap valve 56 away from closing relation with the opening 48 and allow the nozzle to communicate with the filler neck tube 16 below the bottom wall 46 so that, when operated to discharge fuel therethrough, a filling operation can be accomplished.

Figure 1:
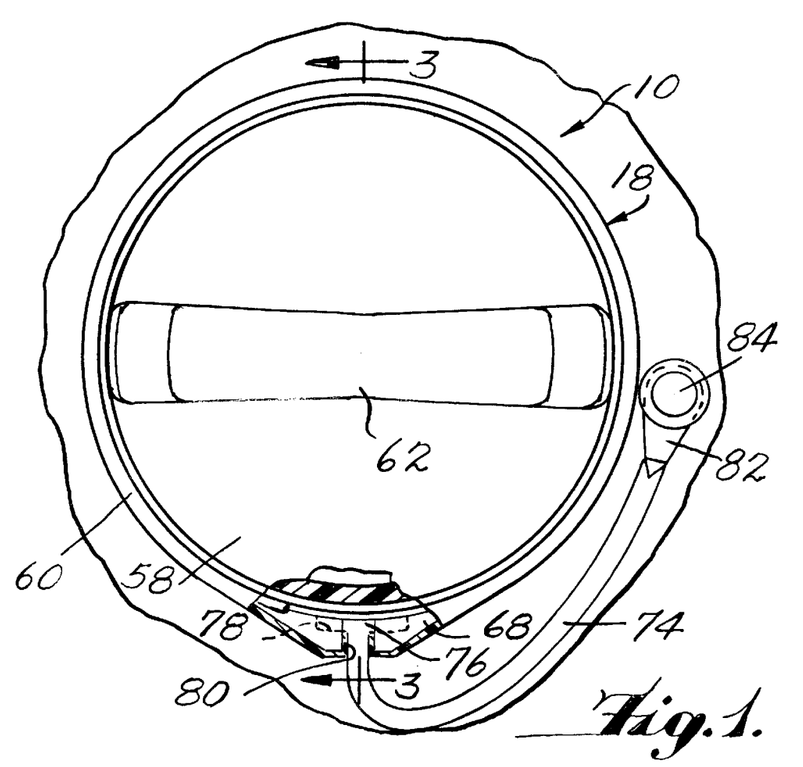
FIG. 1 is a top plan view of a fuel cap embodying the principles of the present invention showing the same in a closing position with respect to a fuel tank filler neck.

As best shown in FIGS. 1–3, the outer shell member 18 includes a dished upper wall 58 having a circular periphery with a skirt 60 extending therefrom. The upper wall 58 has a transversely extending grippable portion 62 projecting upwardly therefrom which has an inverted U-shaped cross-sectional configuration. The skirt 60 is formed with an annular groove 64 in a thickened lower outer peripheral portion thereof which defines an annular tether ring supporting flange 66 at a lower outer periphery of the skirt 60. The exterior surface of the flange 66 is rounded at its lower edge to facilitate the movement of an annular tether ring 68 beyond the annular flange 66 to rest in the annular groove 64 which is defined along its lower edge by an upwardly facing surface of the flange 66.

The annular tether ring 68 includes an interior peripheral configuration providing a downwardly facing generally radially extending annular surface 70 which intersects with an inner peripheral annular surface 72 and extends upwardly and outwardly thereof to intersect with an upwardly facing annular surface at the upper end of the tether ring. The lower end of the tether ring 68, as shown, is shaped to provide an annular depending flange which is adapted to surround the flange 66 at the lower end of the skirt 60 of the outer shell member 18.

The inner peripheral annular surface 72 of the tether ring 68 is shaped so that the tether ring can be moved axially with respect to the skirt 60 in a direction to move past the outer surface of the skirt flange 66 and snap into operative position within the groove 64 with the surface 70 interengaged with the lower surface defining the groove 64. This manner of mounting the tether ring 68 within the annular groove 64 of the skirt 60 serves to permit the tether ring 68 to be freely rotated about the axis of the outer shell member 18 with a free motion.

The tether ring 68 forms a part of tether assembly, which also includes an elongated tether element 74 which is molded of a flexible elastomeric material. One end of the elongated tether element 74 includes a transversely extending connecting element 76. The tether ring 68 has a connecting element receiving groove 78 formed in the inner periphery thereof and a vertically open groove 80 which extends radially from the groove 78 to the exterior periphery of the tether ring 68. The elongated tether element 74 is connected with the tether ring 68 by transversely snapping an end portion thereof through the vertically open groove 80 with the transverse end portion 76 spaced from the inner periphery of the tether ring 68 and then by pulling on the elongated tether element 74 until the transverse end element 76 engages within the groove 78.

The opposite end of the elongated tether element 74 includes a flattened circular portion 82 which receives a pin 84 which is adapted to engage within a snap element suitably fixed to the vehicle frame in spaced relation to the filler tank neck, as, for example, as shown in FIG. 1. It will be understood that the outer end of the tether element 74 can be connected at any other desired location which will enable the cap 10 to be removed by turning the cap 10 with the ring 68 being held substantially against such rotation by the tether element 74. When the cap 10 is removed, the tether element 74 will serve to support the cap 10 in a position out of the way of the upper end of the fuel tank filler neck 12 so that the fuel nozzle can be inserted therein. After the fueling operation has been completed, the cap 10 can then be replaced in closing relation on the upper end of the fuel tank filler neck 12.

As best shown in FIG. 3, the inner annular member 24 of the inner closure assembly 20 is also formed with an annular seal backing flange 86 which extends outwardly from the upper end of the central portion 26. The annular flange 86 includes a lower surface which merges with the adjacent exterior peripheral surface of the central portion 26 to receive in engagement therebelow an annular axially compressible seal 88. The seal 88 is of generally conventional configuration and is shown in a compressed condition in FIG. 3. In its relaxed condition, the seal includes an inner wall having axially spaced annular lips extending outwardly therefrom. The exterior periphery of the seal 88 is of generally circular configuration when the seal 88 is in its relaxed condition. During axial compression of the seal 88, the two lips can be moved into engaged relation with respect to one another, as shown in FIG. 3.

The inner annular member 24 of the inner closure assembly 20 also includes an annular connecting ring 90 which is disposed axially above the annular flange 86 and radially outwardly therefrom. The annular connecting ring 90 includes an exterior periphery which defines a downwardly facing radially extending surface which intersects with an upwardly and inwardly extending peripheral surface. The interior periphery of the outer shell member skirt 60 is provided with a series of annularly spaced wedge-shaped connecting lugs 92 which enable the outer shell member 18 to be snap fitted over the connecting ring 90.

Figure 6:
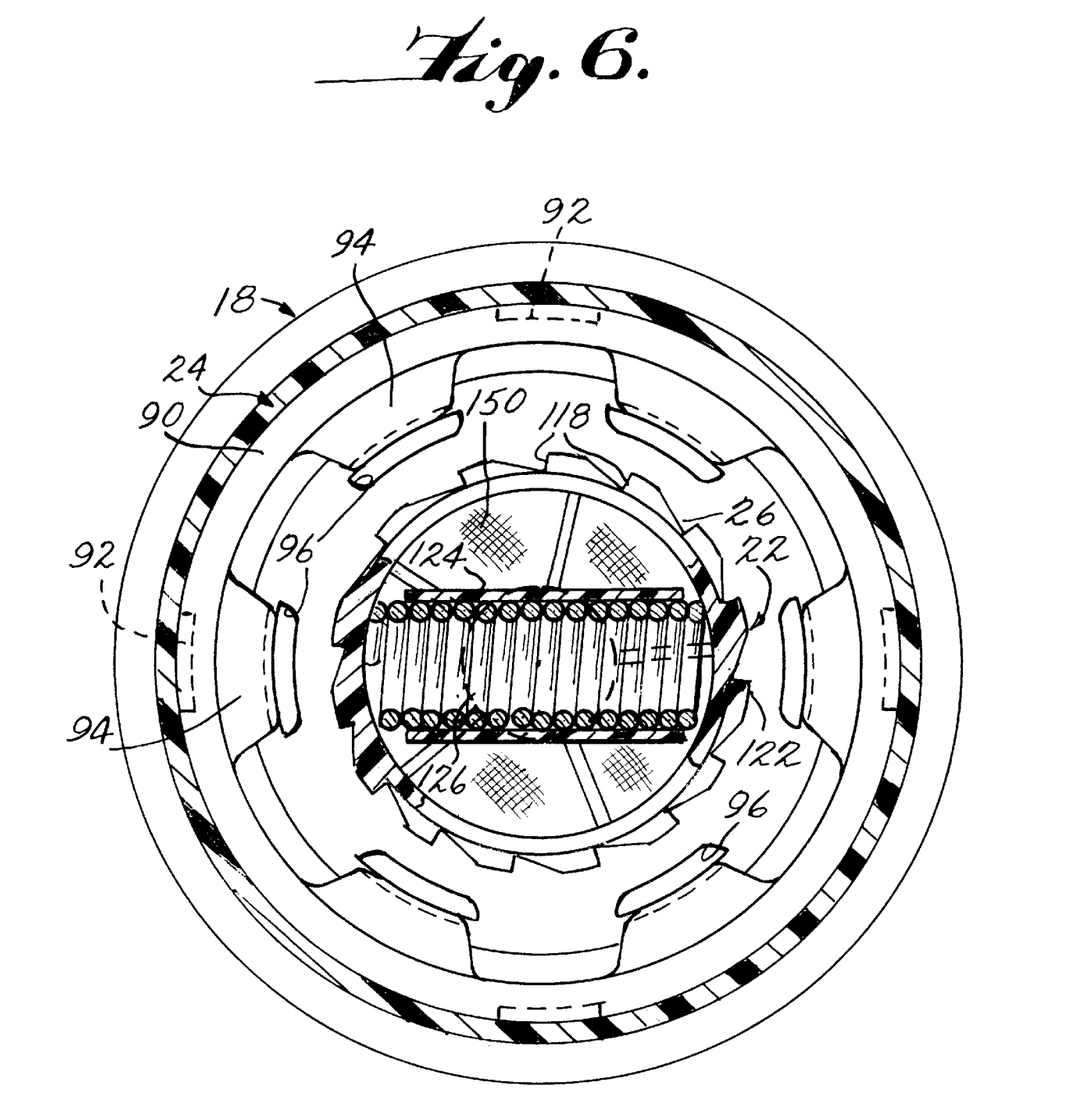
FIG. 6 is a sectional view taken along the line 6—6 of FIG. 3.

The connecting ring 90 is integrally interconnected as a part of the inner annular member 24 by a series of equally annularly spaced connecting elements 94 extending inwardly therefrom to the exterior periphery of the annular flange 86. As best shown in FIG. 3 and 6, the outer periphery of the annular flange 86 between the connecting elements 94 is defined by surfaces disposed within a common frusto-conical plane which diverges upwardly. It will be noted that the upper surface of the inner annular member 24 is formed with a series of rectangularly shaped arcuate grooves 96 within an annulus spaced slightly inwardly from the juncture of the connecting elements 94 with the flange 86. It will also be noted that a peripheral portion of each of the connecting elements 94 at a position adjacent the flange 86 is defined by surfaces which intersect along a substantially continuous line extending around the connecting element 94 which defines a fracture plane extending across each connecting element 94. Two of the interengaging surfaces of each of the rectangular grooves 96 define the upper extent of the associated encircling line. Moreover, it will be noted that the fracture planes defined by the encircling lines are generally common to the frusto-conical plane of the outer surfaces of the annular flange 86 between the connecting elements 94.

The equally spaced connecting elements 94 are constructed and arranged integrally between the annular connecting ring 90 and the flange 86 on the central annular portion 26 so as to provide areas across the connecting elements 94 where fracture surfaces develop in response to lateral crash impacts imparted to outer member 18 along the skirt 60 thereof to thereby allow the outer member 18 to be separated from the inner closure assembly 20 in a manner which retains the integrity of the annular seal 88 with the filler neck 12. By completing the full line encirclement of each connecting element 94 with the intersecting surfaces of the rectangular grooves 96, the fracturing action is well defined and readily effected. In its broader aspects, it is within the contemplation of the present invention to eliminate the central portion of the grooves 96 and make the upper surface between the ends of each connecting element 94 smooth. The remaining peripheral lines are sufficient to define a fracture plane for each connecting element 94 while enabling fracture to require a somewhat greater impact than with a full peripheral line definition.

The exterior surfaces of the connecting ring 90 and the wedge-shaped lugs 92 on the interior surface of the skirt 60 constitute some of the connecting structure 22 between the inner closure assembly 20 and the outer member 18. The connecting structure 22 also includes a torque transmitting member 98 which is disposed within the outer shell member 18 in a position adjacent and below the upper wall 58 thereof.

The connecting structure 22 also includes a spring system which acts between the outer shell member 18 and the torque transmitting member 98 in a manner which is to be hereinafter more fully explained. While the spring system may assume any number of different configuration, preferably as shown, the spring system is in the form of a torsional coil spring 100 having an end 102 extending across the upper coil of the coil spring 100 and a lower end 104 which extends across the lower coil of the coil spring 100. Formed integrally on the interior surface of the grippable portion 62 is a pair of depending end gripping arms 106 which serve to grip the upper end 102 when pushed therein. Formed integrally on the motion transmitting member 98 and extending upwardly therefrom are a pair of end gripping arms 108 which are adapted to engage the lower end 104 of the coil spring.

Figure 5:
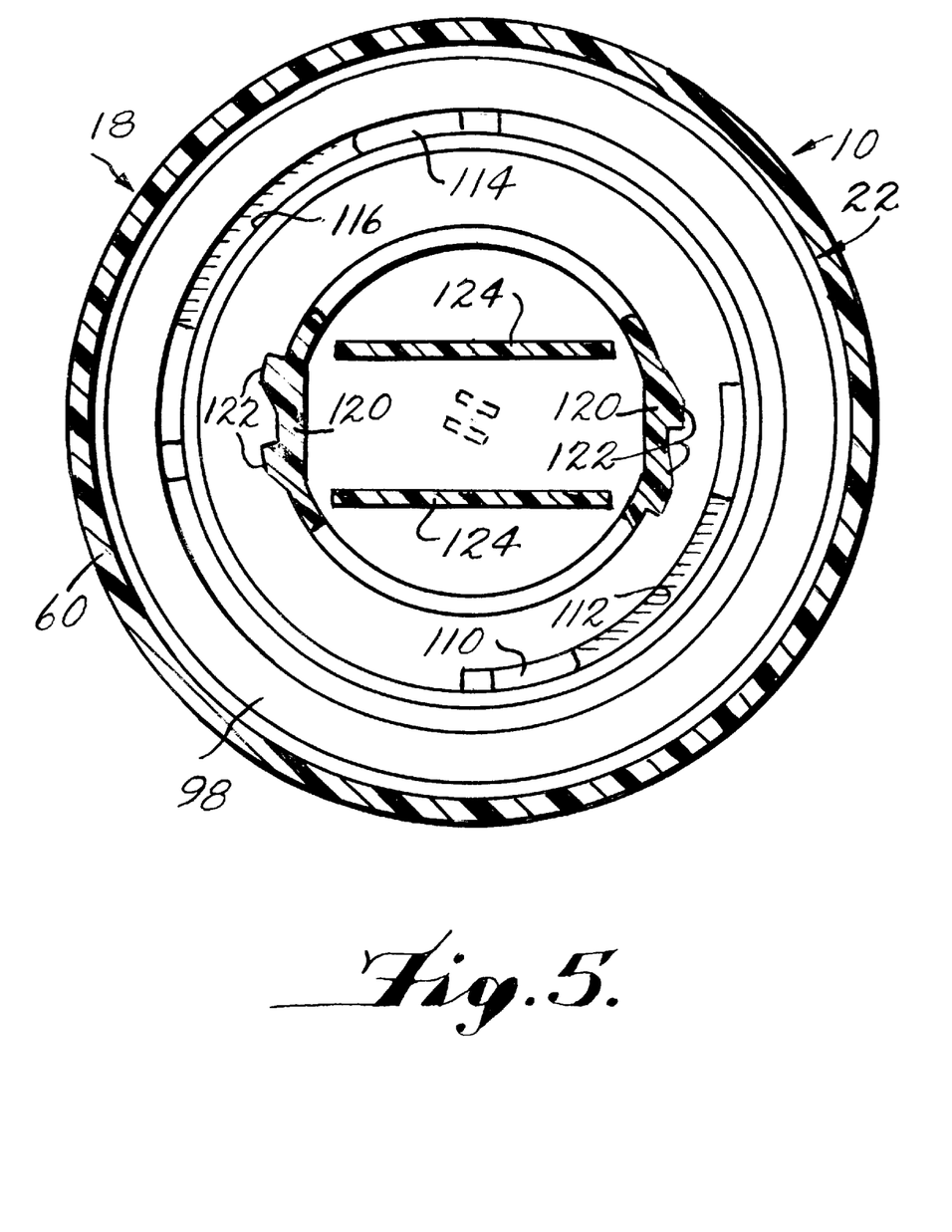
FIG. 5 is a sectional view taken along the line 5—5 of FIG. 3.

As best shown in FIG. 5, the upper wall 58 of the outer shell member 18 has integrally formed thereon a first depending arcuate lug 110 and the torque transmitting member 98 is provided with an arcuate slot 112 which is adapted to receive the arcuate lug 110. Preferably, a second integral arcuate lug 114 is formed in depending relation on the upper wall 58 of the outer shell member 18 for engaging within a second arcuate slot 116 formed in the motion transmitting member 98. As shown, the two lugs 110 and 114 are disposed in diametrically opposed relation to one another with one being spaced outwardly from the turning axis of the outer shell member 18 a greater distance than the other.

The mounting of the lugs 110 and 114 within the slots 112 and 116 provides for a limited amount of relative movement between the outer shell member 18 and the motion transmitting member 98. While the amount of movement may be of any desired extent, as shown approximately 130° of movement is provided between the first and second limiting positions between the two members 18 and 98 when the lugs 110 and 114 engage the opposite ends of the slots 112 and 116. The spring 100 serves to initially mount the motion transmitting member 98 in assembled relation within the outer shell member 18 and the spring 100 is positioned so that, when the two members 18 and 98 are in the first limiting position, the spring 100 is in a relaxed condition or a slightly stressed condition. In the first limiting position, a torque movement applied to the outer member 18 (1) in a direction to move the inner closure assembly 20 toward the closing position thereof is transmitted to the torque transmitting member 98 to move the inner closure assembly 20 into the closing position and (2) in a direction to move the inner closure assembly 20 away from the closing position when the inner closure assembly 20 is in the closing position moves the outer member 18 relative to the torque transmitting member 98 against the bias of the spring 100 until the outer member 18 is in the second limiting position thereof with respect to the torque transmitting member 98, after which further movement of the outer member 18 is transmitted to the torque transmitting member 98 to move the inner closure assembly 20 so that when the amount of torque movement transmitting to the inner closure assembly 20 is enough to disengage the seal 88 from the filler neck 12 and permit relative unrestricted torque movement of the inner closure assembly 20, the spring 100 is operable to effect a relative movement between the outer member 18 and the torque transmitting member 98 from the second limiting position thereof into the first limiting position thereof during which the inner closure assembly 20 is connected to the torque transmitting member 18.

With the lug arrangement as described above, after the lugs 28 have been entered into the annular body 32 at the lug receiving positions 38, a turning movement of 30° will effect the interengagement of the lugs 28 and 36 and a further turning movement of approximately 60° will move the cap 10 into its closing position. Consequently, in the loosening movement, there must be a movement of 130° and then 60° more in order to release the lugs 28 and 36. At this point, when the lugs 28 and 36 release, the seal 88 is pretty much disengaged so that there is very little if any drag on the movement of the inner closure assembly 20 and, therefore, the spring 100 can effect a movement of about 30° without any further movement of the outer shell member 18 manually. At that point, the operator can lift the cap 10 upwardly so that it is out of the fitment 14 and the spring 100 will complete the movement of the inner closure assembly 20 until the torque transmitting member 98 is moved into the first limiting position thereof with respect to the outer shell member 18.

The connecting structure 22 also includes a series of ratchet teeth 118 which are molded into the interior periphery of the inner annular member 24 at a position adjacent the upper end of the central portion 26 thereof. In addition, the torque transmitting member 98 has formed integrally on the lower surface thereof a pair of depending pawl elements 120 which are generally arcuate in shape and each includes two teeth-like elements 122. Also formed integrally on the under surface of the torque transmitting member 98 is a pair of integral spring mounting elements 124 which extend downwardly therefrom in opposed equally spaced relation from the axis. The mounting elements 124 extend transversely between the pair of integral pawl elements 120 and serve to engage opposite sides of a compression spring 126, the ends of which engage between the pawl elements 120 and serve to resiliently bias the same into engagement with the ratchet teeth 118. The cantilevered pawl elements 120 and the ratchet teeth 118 are constructed and arranged to (1) transmit torque movement manually applied to the outer shell member 18 in a direction to movement the inner closure assembly 20 out of the closing position which are imparted to the cantilevered pawl elements 120 to the ratchet teeth 118 to move the inner closure assembly 20 out of the closing position, and (2) transmit torque movements manually applied to the outer member 18 in a direction to move the inner closure assembly 20 towards the closing position imparted to the cantilevered pawl elements 120 to the ratchet teeth 118 in a manner which includes overriding movements therebetween, preventing torque transmittal therebetween above a predetermined value to thereby determine when the inner closure member 20 has reached the closing position and the extent of axial compression imparted to the seal 88.

In its broadest aspects, the present invention contemplates that the inner annular member 24 can have a solid bottom wall which would simply close off the upper end of the filler neck 12 when the cap 10 is disposed in closing relation thereto. In the preferred embodiment shown, however, the inner annular member 24 is provided with a central opening 128 and a series of annularly spaced openings 130 formed in a bottom wall 132 thereof. The openings 128 and 130 enable the cap 10 to include valving which will allow the tank pressure to remain at atmospheric pressure at all times. As shown, an annular upwardly facing valve seat 134 is formed on the interior periphery of the central portion 26 of the inner annular member 24 at a position spaced upwardly from the bottom wall 132 thereof. The valve seat 134 is adapted to be engaged by a washer valve 136 made of a suitable elastomeric material. The washer valve 136 is centered onto the valve seat 134 by a series of annularly spaced lugs 138 which are formed integrally on the interior peripheral surface of the central portion 26 of the inner annular member 24.

The lugs 138 taper inwardly at their upper ends and have flange elements extending inwardly from the upper ends thereof for engaging over an upwardly facing ledge 140 formed on the exterior periphery of an annular filter member, generally indicated at 142. The filter member 142 includes an annular wall 144 extending upwardly from the ledge 140 and a plurality of radial walls 146 extending inwardly therefrom to a hub portion 148. A filter sheet 150 is embedded within the lower portion of the filter member 142 for filtering the passing air vertically between the radial walls 146. It will be understood that the filter member 142 is thus mounted within the interior of the central portion 26 of the inner annular member 24 by a snap action.

A coil spring 152 is engaged over the hub portion 148 of the filter member 142 and has its upper end engaged with the adjacent portion of the filter member 142 and its lower end engaged in the depressed central portion 154 of a valve engaging disk 156 which extends over the upper surface of the washer valve 136. The spring 152 and valve engaging disk 156 thus serve to retain the washer valve 136 in engagement with the valve seat 134. It will be noted that the central portion 154 of the disk 156 is open and that a lower valve disk 158, which is imperforate, is disposed below the washer valve 136. The valve disk 158 is urged upwardly by a coil spring 160 which has its upper end seated on the valve disk 158 and its lower end seated on the bottom wall in surrounding relation to the central opening. The valve disk 158 seals against the washer valve 136 to provide a seal. However, when negative pressure conditions exist in the filler tank, the spring 160 will allow the valve disk 158 to move downwardly away from the washer valve 136 to equalize the pressure. When the pressure conditions in the tank are above atmosphere, both the valve disk 158 and the washer valve 136 will move upwardly away from the valve seat 134 to equalize the conditions. It will be understood that other conventional valve arrangements may be utilized as well as the valving arrangements described above.

Any United States patent applications or patents mentioned or cited hereinabove are hereby incorporated by reference into the present specification.

It thus will be seen that the objects of this invention have been fully and effectively accomplished. It will be realized, however, that the foregoing preferred specific embodiments have been shown and described for the purpose of illustrating the functional and structural principles of this invention and is subject to change without departure from such principles. Therefore, this invention includes all modifications encompassed within the spirit and scope of the following claims.

What is claimed is:

1. A fuel cap comprising an inner closure assembly constructed and arranged to be moved into and out of a closing position within a fuel tank filler neck by oppositely directed installation and removal torque movements about an axis, said inner closure assembly including an annular closure member having a plurality of annularly spaced cap lugs fixed thereon constructed and arranged to pass axially through a plurality of lug receiving positions defined by filler neck lugs on the filler neck and to move annularly about said axis in cooperating relation with the filler neck lugs when said inner closure assembly is moved into and out of closing position within the fuel tank filler neck, said annular closure member also having a transversely extending annular flange thereon in axially fixed relation to said plurality of cap lugs, an axially deformable annular seal mounted on said annular closure member in abutting relation to said annular flange constructed and arranged to engage and seal with an annular sealing surface of the filler neck, an outer member constructed and arranged to be manually engaged and to have oppositely directed installation and removal torque movements manually applied thereto, and connecting structure between said inner closure assembly and said outer member constructed and arranged to enable manually engaged movements of said outer member to be transmitted to said inner closure assembly to move said inner closure assembly into and out of said closing position, said connecting structure including a torque override ratcheting assembly constructed and arranged to transmit to said closure assembly (1) installation torque movements applied to said outer member after said cap lugs have been passed axially through the lug removing positions of the filler neck and (2) removal torque movements applied to said outer member after said closure assembly has been moved into the closing position thereof, said torque override ratcheting assembly being constructed and arranged such that the aforesaid installation torque movements applied to said outer member will move said cap lugs annularly about said axis in cooperating relation with the filler neck lugs to effect a progressive axial deformation of said annular seal between said annular flange and the annular sealing surface of the filler neck until a predetermined amount of torque applied to said outer member establishes a proper seal deformation and thereafter ratcheting override movements of the outer member take place without movement of said cap lugs.

2. A fuel cap as defined in claim 1 wherein said torque override ratcheting assembly includes a series of ratchet teeth formed in said annular closure member, a pair of integral pawl elements extending downwardly from said motion transmitting member in opposed equally spaced relation from said axis, and a compression coil spring disposed in stressed relation between said pair of pawl elements so as to resiliently bias said pair of pawl elements into engagement with said ratchet teeth.

3. A fuel cap as defined in claim 2 wherein said motion transmitting member includes a pair of integral spring mounting elements extending downwardly therefrom in opposed equally spaced relation from said axis and extending transversely between said pair of integral pawl elements to engage opposite sides of said compression coil spring therebetween.

4. A fuel cap as defined in claim 1 wherein said annular closure member includes an annular connecting ring mounted within said outer member skirt and a series of equally annularly spaced integral connecting elements extending inwardly therefrom to a central portion of said annular closure member at positions disposed axially outwardly of said annular seal, said equally spaced connecting elements being constructed and arranged between said annular connecting ring and the central portion of said annular closure member so as to provide areas across said connecting elements where fracture surfaces develop in response to lateral crash impacts imparted to said outer member along the skirt wall thereof to thereby allow the outer member to be separated from said inner closure assembly in a manner which retains the integrity of said annular seal with the filler neck.

5. A fuel cap as defined in claim 4 wherein a peripheral portion of each of said connecting elements is defined by surfaces which intersect along a line extending around the connecting element which defines a fracture plane across each connecting element.

6. A fuel cap as defined in claim 5 wherein said annular flange extends outwardly of said annular closure member and has an outer periphery which is integrally connected with said annularly spaced connecting elements, said annular seal being disposed in abutting relation below said annular flange with an inner periphery thereof in abutting relation to an outer periphery of said central portion below said annular flange.

7. A fuel cap as defined in claim 6 wherein the outer periphery of said annular flange between said connecting elements is defined by surfaces disposed within a common frustoconical plane which diverges upwardly.

8. A fuel cap as defined in claim 7 wherein the lines extending around the connecting elements define by spaced fracture planes common to said frustoconical plane.

9. A fuel cap as defined in claim 1 including a fitment mountable on the end of a fuel filler neck and cooperable with said cap, said fitment comprising an annular body open at its upper end and having a bottom wall at its lower end formed with a nozzle receiving opening therein, a flap valve on the underside of said bottom wall, said flap valve being constructed and arranged to normally close said nozzle receiving opening and to allow a nozzle to be moved through said opening to move said flap valve away from closing relation with said opening and allow the nozzle to communicate with the filler neck below said bottom wall, said annular body having a annular surface at its open upper end defining the annular sealing surface of the filler neck and a plurality of cap connecting lugs extending inwardly from the open upper end thereof in annularly spaced relation defining the filler neck lugs of the filler neck.

10. A fuel cap as defined in claim 9 wherein said annular body includes an L-shaped guide surface at each lug entering position constructed and arranged to ensure that an associated cap lug can only move in said one annular direction after said inner annular member is moved within said annular body.

11. A fuel cap as defined in claim 10 wherein said bottom wall is provided by a molded bottom wall body separate from said annular body, said bodies having interengaging surfaces constructed and arranged so that when said bodies are moved from an axially spaced realation axially together said interengaging surfaces snap fit together to retain said bodies together.

12. A fuel cap as defined in claim 1 including a tether assembly carried by said outer member, said tether assembly comprising a tether ring providing a downwardly facing generally radially extending annular surface which intersects with an inner peripheral annular surface which extends upwardly and outwardly to intersect with an upwardly facing annular surface at the upper end of said tether ring and an elongated tether element extending outwardly of said tether ring having a free end constructed and arranged to be connected at a fixed location spaced from said cap, the skirt of said outer cap member having an annular groove formed in an outer peripheral portion thereof which defines an annular tether ring supporting flange at a lower outer periphery of said skirt, the configuration of said tether ring supporting flange cooperating with said inner peripheral annular surface of said tether ring to allow said tether ring to be moved axially upwardly over said tether ring supporting flange with a snap action into an operative position wherein the downwardly facing annular surface of said ring engages said tether ring supporting flange to support the tether ring thereon for free rotational movement with respect to said skirt.

13. A fuel cap as defined in claim 12 wherein said elongated tether element includes a transversely extending connecting element formed integrally on an end thereof, said tether ring having a connecting element receiving groove formed in the inner periphery thereof and a vertically open groove extending radially therefrom to the exterior periphery of said tether ring, said elongated tether element being connected with said tether ring by the transversely extending element and adjacent end portion of said elongated tether element engaging in said grooves.

14. A fuel cap as defined in claim 1 wherein said seal comprises an elastomeric annular member having an inner wall with axially spaced lips extending outwardly thereof.

15. A fuel cap as defined in claim 1 wherein said annular closure member has a pressure responsive valve assembly mounted therein.

16. A fuel cap comprising an inner closure assembly constructed and arranged to be moved into and out of a closing position within a fuel tank filler neck by oppositely directed torque movements about an axis, said inner closure assembly including an axially compressible annular seal constructed and arranged so that (1) during the torque movement of said inner closure assembly in a direction to move said inner closure assembly toward said closing position the seal is engaged with the filler neck and then increasingly compressed against the filler neck after engagement therewith until said inner closure assembly is moved into said closing position and (2) during the torque movement of said inner closure assembly in a direction out of said closing position the seal is relieved of compression against the filler neck and then disengaged from the filler neck, an outer member constructed and arranged to be manually engaged and to have oppositely directed torque movements manually applied thereto and connecting structure between said inner closure assembly and said outer member constructed and arranged to enable oppositely directed torque movements manually applied to said outer member to be transmitted to said inner closure assembly to move said inner closure assembly into and out of said closing position, said inner closure assembly including an inner annular member concentric with said axis, said connecting structure including a series of ratchet teeth formed in said inner annular member, a pair of integrally interconnected cantilevered pawl elements operatively associated with said outer member disposed in opposed equally spaced relation from said axis and a compression coil spring disposed in stressed relation between said pair of cantilevered pawl elements so as to resiliently bias said pair of cantilevered pawl elements into engagement with said ratchet teeth, said cantilever pawl elements and said ratchet teeth being constructed and arranged to (1) transmit torque movements manually applied to said outer member in a direction to move said inner closure assembly out of said closing position which are imparted to said cantilevered pawl elements to said ratchet teeth to move said inner closure assembly out of said closing position and (2) transmit torque movements manually applied to said outer member in a direction to move said inner closure assembly toward said closing position imparted to said cantilevered pawl elements to said ratchet teeth in a manner which includes overriding movements therebetween preventing torque transmittal therebetween above a predetermined value to thereby determine when the inner closure assembly has reached the closing position the extent of axial compression imparted to said seal.

17. A fuel cap as defined in claim 16 wherein said seal comprises an elastomeric annular member having an inner wall with axially spaced lips extending outwardly thereof.

18. A fuel cap as defined in claim 17 wherein said motion transmitting member includes a pair of integral spring mounting elements extending downwardly therefrom in opposed equally spaced relation from said axis and extending transversely between said pair of integral pawl elements to engage opposite sides of said compression coil spring therebetween.

19. A fuel cap as defined in claim 16 wherein said inner annular member includes an annular connecting ring mounted within said outer member skirt and a series of equally annularly spaced integral connecting elements extending inwardly therefrom to a central portion of said inner annular member at positions disposed axially outwardly of said seal, said equally spaced connecting elements being constructed and arranged between said annular connecting ring and the central portion of said inner annular member so as to provide areas across said connecting elements where fracture surfaces develop in response to lateral crash impacts imparted to said outer member along the skirt wall thereof to thereby allow the outer member to be separated from said inner closure assembly in a manner which retains the integrity of said seal with the filler neck.

20. A fuel cap as defined in claim 19 wherein a peripheral portion of each of said connecting elements is defined by surfaces which intersect along a line extending around the connecting element which defines a fracture plane across each connecting element.

21. A fuel cap as defined in claim 20 wherein said inner annular member includes an annular flange extending outwardly therefrom having an outer periphery which is integrally connected with said annularly spaced connecting elements, said seal being disposed in abutting relation below said annular flange with an inner periphery thereof in abutting relation to an outer periphery of said central portion below said annular flange.

22. A fuel cap as defined in claim 16 including a fitment mountable on the end of a fuel filler neck and cooperable with said cap, said fitment comprising an annular body open at its upper end and having a bottom wall at its lower end formed with a nozzle receiving opening therein, a flap valve on the underside of said bottom wall, said flap valve being constructed and arranged to normally close said nozzle receiving opening and to allow a nozzle to be moved through said opening to move said flap valve away from closing relation with said opening and allow the nozzle to communicate with the filler neck below said bottom wall, said annular body having a seal engaging annular surface at its open upper end and a plurality of cap connecting lugs extending inwardly from the open upper end thereof in annularly spaced relation so as to define a plurality of annularly spaced cap lug entering positions within the open end of said annular body, said inner annular member being of a size to enter within the open end of said annular body within the cap connecting lugs thereof, said inner annular member having a plurality of integral lugs extending outwardly thereof in annularly spaced relation of a size to enter within the cap lug entering positions of said annular body, said plurality of cap lugs and said plurality of cap connecting lugs having interengaging surfaces constructed and arranged so that when said inner annular member is moved within said annular body and turned in one direction into a closing position with respect to said annular body, said interengaging surfaces will interengage and cause said annular seal to be axially compressed against said annular seal engaging surface.

23. A fuel cap as defined in claim 22 wherein said annular body includes an L-shaped guide surface at each lug entering position constructed and arranged to ensure that an associated cap lug can only move in said one direction after said inner annular member is moved within said annular body.

24. A fuel cap as defined in claim 23 wherein said bottom wall is provided by a molded bottom wall body separate from said annular body, said bodies having interengaging surfaces constructed and arranged so that when said bodies are moved from an axially spaced relation axially together said interengaging surfaces snap fit together to retain said bodies together.

25. A fuel cap as defined in claim 16 including a tether assembly carried by said outer member, said tether assembly comprising a tether ring providing a downwardly facing generally radially extending annular surface which intersects with an inner peripheral annular surface which extends upwardly and outwardly to intersect with an upwardly facing annular surface at the upper end of said tether ring and an elongated tether element extending outwardly of said tether ring having a free end constructed and arranged to be connected at a fixed location spaced from said cap, said outer cap member including a depending skirt having an annular groove formed in an outer peripheral portion thereof which defines an annular tether ring supporting flange at a lower outer periphery of said skirt, the configuration of said tether ring supporting flange cooperating with said inner peripheral annular surface of said tether ring to allow said tether ring to be moved axially upwardly over said tether ring supporting flange with a snap action into an operative position wherein the downwardly facing annular surface of said ring engages said tether ring supporting flange to support the tether ring thereon for free rotational movement with respect to said skirt.

26. A fuel cap as defined in claim 25 wherein said elongated tether element includes a transversely extending connecting element formed integrally on an end thereof, said tether ring having a connecting element receiving groove formed in the inner periphery thereof and a vertically open groove extending radially therefrom to the exterior periphery of said tether ring, said elongated tether element being connected with said tether ring by the transversely extending element and adjacent end portion of said elongated tether element engaging in said grooves.

27. A fuel cap comprising a manually engageable member constructed and arranged to be manually grasped and turned about a turning axis in an installation direction and an opposite removal direction, a closure assembly constructed and arranged to be turned about said turning axis in said installation and removal directions including connecting structure constructed and arranged to connect said closure assembly in an operative installed condition with a filling neck when turned in the installation direction a portion of one full turn and to disconnect said closure assembly from the filling neck into a disconnected condition when turned in the removal direction a portion of one full turn, said closure assembly also including sealing structure constructed and arranged to seal the closure assembly with respect to a seat on the filling neck when said closure assembly is connected in said operative installed condition with the filling neck, and a spring-biased lost motion connection between said manually engageable member and said closure assembly including first and second sets of stop surfaces movable relatively between (1) an interengaging installation position wherein said closure assembly is turned in said installation direction by the turning of said manually engageable member in said installation direction and (2) an annularly displaced interengaging removal position wherein said closure assembly is turned in said removal direction by the turning of said manually engageable member in said removal direction, said first and second sets of stop surfaces including (1) first and second pairs of installation stop surfaces constructed and arranged to be spring-biased into an interengaged relation in generally diametrically opposed relation to one another when said first and second sets of stop surfaces are in said installation position, and (2) first and second pairs of removal stop surfaces constructed and arranged to the retained against said spring bias into interengaged relation when said first and second sets of stop surfaces are retained in said removal position, said first and second pairs of installation stop surfaces being movable relatively along distinctly different arcuate paths disposed within distinctly different annuli with respect to said axis.

28. A fuel cap as defined in claim 27 wherein said spring biased lost motion connection includes a torque transmitting member between said manually engageable member and said closure assembly, said torque transmitting member having first and second slots formed therein arcuate about said turning axis, said manually engageable member having integral depending first and second lugs slidably engaged within said first and second slots respectively, said first lug and said first slot each having opposed ends defining said first set of stop surfaces, said second lug and said second slot each having opposed ends defining said second set of stop surfaces, the ends of said first lug and the ends of said first slot providing said first set of stop surfaces, the ends of said second lug and the ends of said second slot providing said second set of stop surfaces, said spring biased lost motion connection also including a spring system between said manually engageable member and said torque transmitting member.

29. A fuel cap as defined in claim 27 wherein said first and second sets of stop surfaces a reconstructed and arranged to allow an arcuate movement of approximately 130° between said installation portion and said removal position.

30. A fuel cap cooperable with a fuel filler neck of the type comprising an annular body open at its upper end and having a bottom wall at its lower end formed with a nozzle receiving opening therein, the annular body having a seal engaging annular surface at its open upper end and a plurality of cap connecting lugs extending inwardly from the open upper end thereof in annularly spaced relation so as to define a plurality of annularly spaced cap lug entering positions within the open end of said annular body, said cap including an inner closure assembly including an inner annular member of a size to enter within the open end of the annular body within the cap connecting lugs thereof, said inner annular member having a plurality of integral lugs extending outwardly thereof in annularly spaced relation of a size to enter within the cap lug entering positions of the annular body, said inner annular member having an integral annular flange extending outwardly therefrom in axially outwardly spaced relation from said lugs, an axially compressible annular seal extending around said inner annular member in abutting relation below said annular flange, an outer member constructed and arranged to be manually engaged and to have oppositely directed torque movements manually applied thereto and connecting structure between said inner closure assembly and said outer member constructed and arranged to enable oppositely directed torque movements applied to said outer member to be transmitted in a predetermined way to said inner closure assembly to move said inner closure assembly into and out of said closing position, said plurality of cap lugs having engaging surfaces constructed and arranged with respect to the plurality of cap connecting lugs so that when said inner annular member is moved within the annular body and turned in one direction into a closing position with respect to the annular body, said engaging surfaces will interengage with surfaces of the plurality of cap connecting lugs and cause said annular seal to be compressed between said annular flange and the annular seal engaging surface of the fitment.

31. A fuel cap as defined in claim 30 wherein the annular body of the fitment includes a guide surface at each lug entering position, said cap lugs being constructed and arranged to ensure that an associated cap lug can only move in said one direction after said inner annular member is moved within the annular body of the fitment.

32. A fuel cap comprising an inner closure assembly constructed and arranged to be moved into and out of a closing position within a fuel tank filler neck by oppositely directed torque movements about an axis, an outer member constructed and arranged to be manually engaged and to have oppositely directed torque movements manually applied thereto, connecting structure between said inner closure assembly and said outer member constructed and arranged to enable oppositely directed torque movements applied to said outer member to be transmitted to said inner closure assembly to move said inner closure assembly into and out of said closing position, and a tether assembly carried by said outer member, said tether assembly comprising a tether ring providing a downwardly facing generally radially extending annular surface which intersects with an inner peripheral annular surface which extends upwardly and outwardly to intersect with an upwardly facing annular surface at the upper end of said tether ring and an elongated tether element extending outwardly of said tether ring having a free end constructed and arranged to be connected at a fixed location spaced from said cap, said outer member including a depending skirt having an annular groove formed in an outer peripheral portion thereof which defines an annular tether ring supporting flange at a lower outer periphery of said skirt, the configuration of said tether ring supporting flange cooperating with said inner peripheral annular surface of said tether ring to allow said tether ring to be moved axially upwardly over said tether ring supporting flange with a snap action into an operative position wherein the downwardly facing annular surface of said ring engages said tether ring supporting flange to support the tether ring thereon for free rotational movement with respect to said skirt.

33. A fuel cap as defined in claim 32 wherein said elongated tether element includes a transversely extending connecting element formed integrally on an end thereof, said tether ring having a connecting element receiving groove formed in the inner periphery thereof and a vertically open groove extending radially therefrom to the exterior periphery of said tether ring, said elongated tether element being connected with said tether ring by the transversely extending element and adjacent end portion of said elongated tether element engaging in said grooves.

* * * * *